United States Patent [19]
Hippenmeyer et al.

[11] Patent Number: 6,025,963
[45] Date of Patent: Feb. 15, 2000

[54] OPTICAL APPARATUS COMPRISING AN ADJUSTABLE HOLDER DEVICE

[75] Inventors: Heinrich Hippenmeyer, Freiamt; Christoph Anselment, Waldkirch, both of Germany

[73] Assignee: Sick AG, Waldkirch, Germany

[21] Appl. No.: 09/012,673

[22] Filed: Jan. 23, 1998

[30] Foreign Application Priority Data

Jan. 24, 1997 [DE] Germany .......................... 197 02 573

[51] Int. Cl.[7] .................................................. G02B 7/02
[52] U.S. Cl. .......................................... 359/819; 359/811
[58] Field of Search .................................. 359/641, 844, 359/849, 819, 811, 822, 823

[56] References Cited

U.S. PATENT DOCUMENTS

| | | | |
|---|---|---|---|
| 3,119,185 | 1/1964 | Gray | 33/297 |
| 3,957,359 | 5/1976 | Meginnis | 350/319 |
| 4,153,340 | 5/1979 | Uesugi | 350/252 |
| 5,191,481 | 3/1993 | Takizawa et al. | 359/811 |
| 5,394,430 | 2/1995 | Huang | 372/107 |
| 5,581,415 | 12/1996 | De Graffenried | 359/819 |

FOREIGN PATENT DOCUMENTS

| | | |
|---|---|---|
| 29 24 119 | 12/1979 | Germany . |
| 201 826 | 8/1983 | Germany . |
| 3219399A1 | 11/1983 | Germany . |
| 4237775C1 | 1/1994 | Germany . |
| 4303956A1 | 8/1994 | Germany . |
| 9420269 U | 3/1995 | Germany . |
| 9418456 U | 4/1995 | Germany . |
| 08179177A | 7/1996 | Japan . |

*Primary Examiner*—Ramon O. Ramirez
*Assistant Examiner*—Gwendolyn Baxter
*Attorney, Agent, or Firm*—Townsend and Townsend and Crew LLP

[57] ABSTRACT

A laser diode module as an example has a laser diode pressed into a first housing part and a lens of an optical collimation system pressed into a cup-shaped second housing part. The second housing part is pressed into a cylindrical opening of the first housing part. In the opening there are molded three runners, which extend in the axial direction and are uniformly distributed in the peripheral direction, with the runners engaging on the jacket surface of the second housing part. The runners and the jacket surface form connection elements which are press-fitted together and which enable, apart from the connection, an adjustment of the lens relative to the laser diode. Pressure die cast zinc is in particular suitable as the material for the connection elements. An adhesive bond is not required with a holder of this kind.

14 Claims, 4 Drawing Sheets

Fig. 2

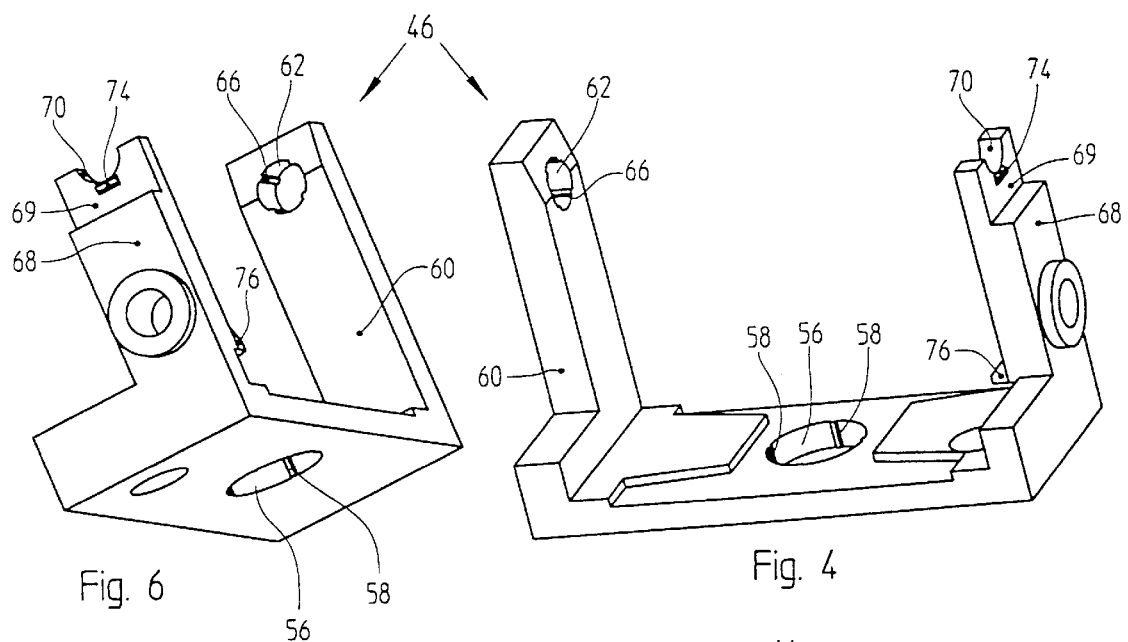
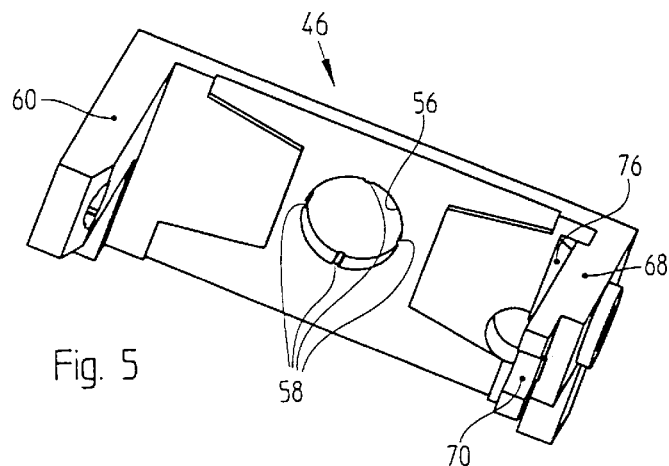

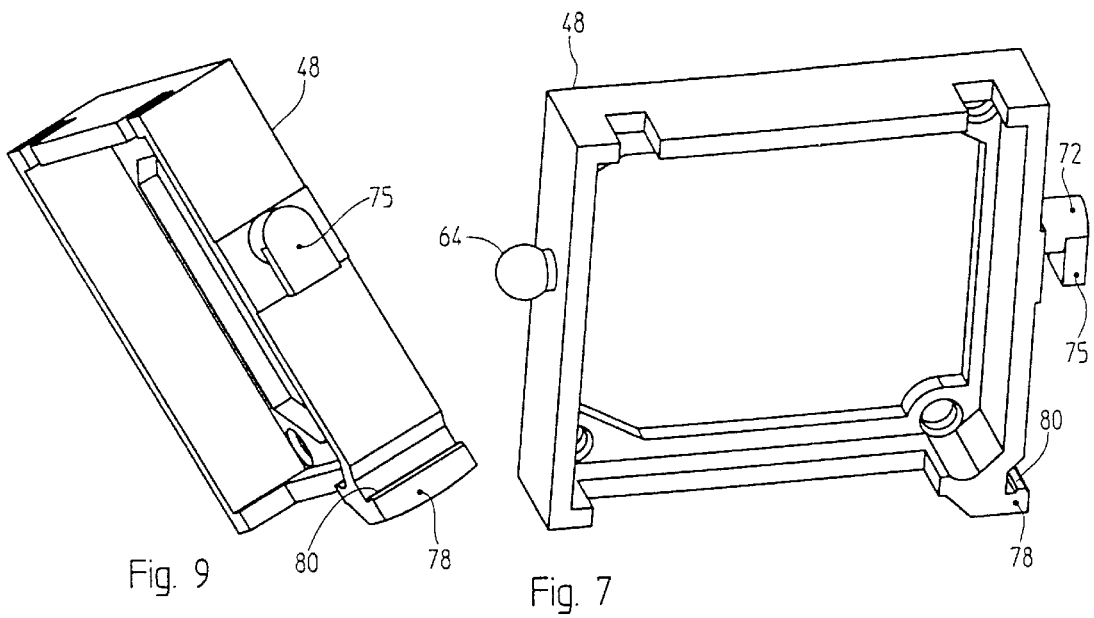
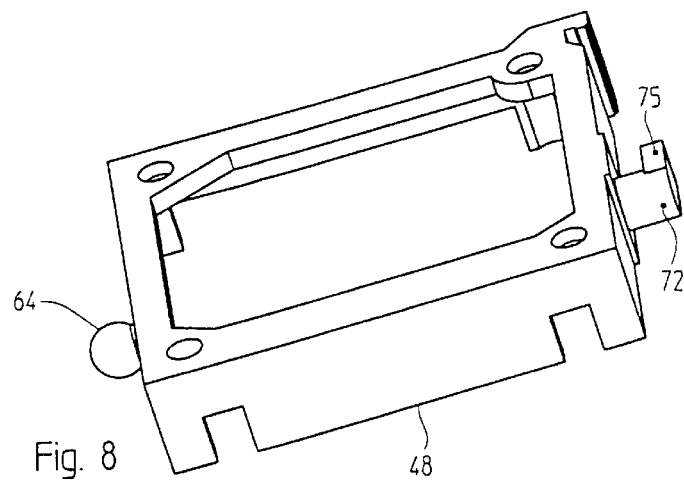
Fig. 9
Fig. 7
Fig. 8

OPTICAL APPARATUS COMPRISING AN ADJUSTABLE HOLDER DEVICE

FIELD OF THE INVENTION

The invention relates to an optical apparatus with an adjustable holder device having at least one first component which can be aligned with a second component, of which both components have optical elements, or the first component is an optical element and the second component is a holder therefor.

DESCRIPTION OF PRIOR ART

An apparatus of this kind has components which can be aligned relative to one another, for example a laser diode and an associated optical collimation system, with each of these optical elements being anchored in a holder. In this respect it is known either to align the optical elements relative to one another in their holders or to align the holders relative to one another by auxiliary fastening means and subsequently to fix the adjusted focal position by means of an adhesive. In just the same way it is known to fix the adjusted focal position by means of a screw connection which requires additional fastening means in disadvantageous manner.

Prior art of this kind requires either relatively complicated auxiliary fastener means and/or relatively complicated working processes for the adjustment and fixation.

OBJECT OF THE INVENTION

The invention is thus based on the object of providing an optical apparatus with an adjustable holding device, which makes do with the fewest possible auxiliary means and requires little working effort during adjustment.

BRIEF DESCRIPTION OF THE INVENTION

The problem set is satisfied in accordance with the invention in that the components have connection elements forming a press fit.

In a solution of this kind the assembling together of the component and the adjustment can take place in a single working process and can be carried out by an automatic unit. Furthermore, the fixation by means of an adhesive, by means of other mechanical fastening means or an additional working step (for example flanging) is avoided, because the press fit ensures a reliable fixation.

A particularly advantageous solution for the invention arises through the arrangement of runners in accordance with a specific embodiment in that a sliding seat is made possible which is free of clearance but which is nevertheless displaceable. The position set during adjustment remains reliably preserved as a consequence of the self-locking connection.

A permanent stable connection can in particular be achieved through the choice of metal in another specific embodiment 3.

The use, in accordance with of the invention, of zinc is particularly advantageous, with the components or the holders preferably being manufactured in the pressure die casting process. In addition to particular stability, zinc on zinc has excellent sliding characteristics. By way of example, a press-fitted seating is still ensured even after five to six subsequent displacements of the connection elements relative to one another.

A further suitable material is aluminum.

It is also conceivable to manufacture the connection elements from a suitable plastic.

In another embodiment of the invention, one component comprises simply two individual parts, namely the optical element, for example a laser diode or a lens, and the holder. Further securing means are not required.

Thus, in accordance with the invention, a laser diode module having a laser diode with a holder and a lens with a holder can be assembled from only four individual parts, with the lens and the laser diode moreover being adjustable relative to one another without further auxiliary means.

Further advantages of the invention result from the following explanation of embodiments.

BRIEF DESCRIPTION OF THE DRAWINGS

FIG. 4 is a fastener yoke for the mirror holder of FIG. 3 in a perspective rear view, FIG. 5 the fastener yoke of FIG. 4 in a perspective plan view, FIG. 6 the fastener yoke of FIG. 4 in a further perspective view, FIG. 7 a frame for the mirror holder in accordance with FIG. 3 in a perspective rear view, FIG. 8 is the frame of FIG. 7 in a further perspective view, and FIG. 9 is the frame of FIG. 7 in a further perspective view.

DESCRIPTION OF PREFERRED EMBODIMENTS

Figure 1:
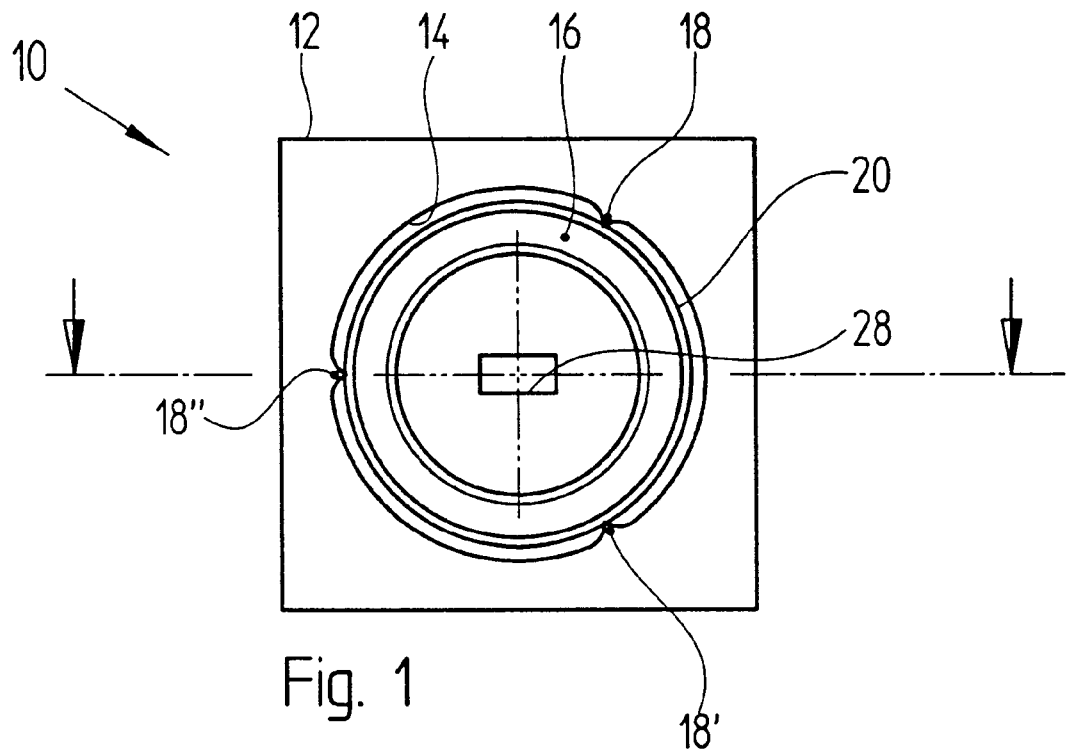
FIG. 1 is a laser diode module in front view.

The laser diode module 10 shown in FIG. 1 has a first outer housing part 12 with a cylindrical opening 14, into which a second cup-shaped inner housing part 16 is adjustably inserted relative to the first housing part 12. The second housing part 16 is held by three runners or splines 18, 18', 18" arranged on the first housing part 12, which extend in the axial direction of the cylindrical opening 14 and are uniformly distributed peripherally within the opening 14. The runners 18, 18', 18" press with a press fit (interference fit) against the jacket surface 20 of the cup-like second housing part 16, so that the latter can be axially shifted for the adjustment after overcoming the holding force of the press fit. The two housing parts 12, 16 preferably consist of pressure die cast zinc, since zinc on zinc has, on the one hand, good sliding characteristics and, on the other hand, however, also a stable sticking capability.

Figure 2:
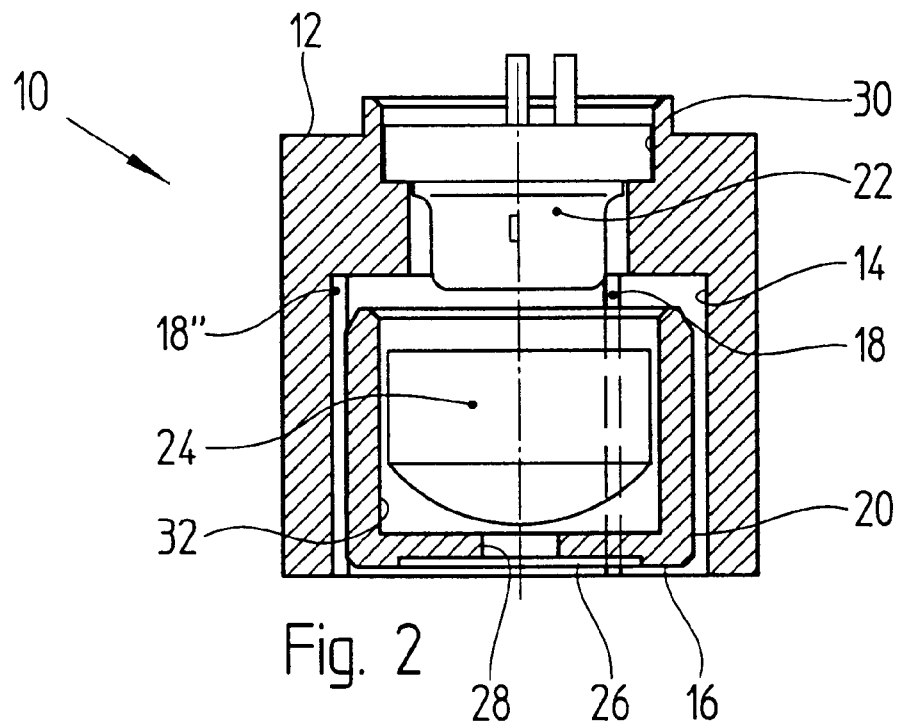
FIG. 2 is a laser diode module in accordance with FIG. 1 in a section perpendicular to the plane of the front view of FIG. 1 in accordance with the arrows II—II in FIG. 1.

It can be seen from FIG. 2 that a laser diode 22 is fixed in the first housing part 12, and a lens 24 of an optical collimation system is fixed in the second, cup-like housing part 16. A light outlet opening 28 is arranged in the base of the cup-like housing part 16, through which the laser beam produced by the laser diode 22 and focused by the lens 24 emerges.

The laser diode 22 is directly pressed via four runners or splines, similar to the mentioned runners 18, 18', 18", into a cut-out 30 of the first housing part 12. The lens 24 is directly pressed via three runners into a cutout 32 of the cup-like housing part 16. During the pressing-in action, the apex edges of the runners are at least partly deformed. In this way a reliable and permanent connection arises between the respective housing parts 12, 16 and the associated optical element 22, 24. Each of the two components 12, 22; 16, 24 pre-installed in this way consists only of two elements.

The assembling together and adjustment can take place in a single working step in as much as the pre-installed second component comprising the second, cup-like housing part 16 and the lens 24 is pressed into the first component comprising a first housing part 12 and the laser diode 22 and is simultaneously aligned by axial displacement. During this adjustment the laser beam generated by the laser diode 22 is focused by the lens 24 in accordance with the requirements. During the pressing-in action, the apex edges of the runners 18, 18', 18" are at least partly compressed hereby. As already mentioned, the housing parts 12, 16 preferably consist of pressure die cast zinc. It is, however, also possible to use another metal, such as for example aluminum or a suitable plastic. It is also conceivable to manufacture only the runners 18, 18', 18" and the jacket surface 20 of the second, cup-like housing part 16 of a preferred material, such as for example zinc. Quite generally zinc has the special advantage that it can be precisely cast and that it has good sliding characteristics. It is, for example, possible with zinc that the components which are to be aligned relative to one another can be displaced a further five to six times after the first pressing in and that, nevertheless, a press fit is ensured. A connection of this kind is absolutely free of clearance and does not require any securing by adhesive.

A further advantage of the above explained apparatus of the invention lies in the fact that the installation and adjustment can take place in one working step by an automatic unit.

Although the runners in the above embodiment are each shown in substantially cylindrical openings or cut-outs, the openings or cut-outs can also have a different cross-section, for example a square cross-section.

Figure 3:
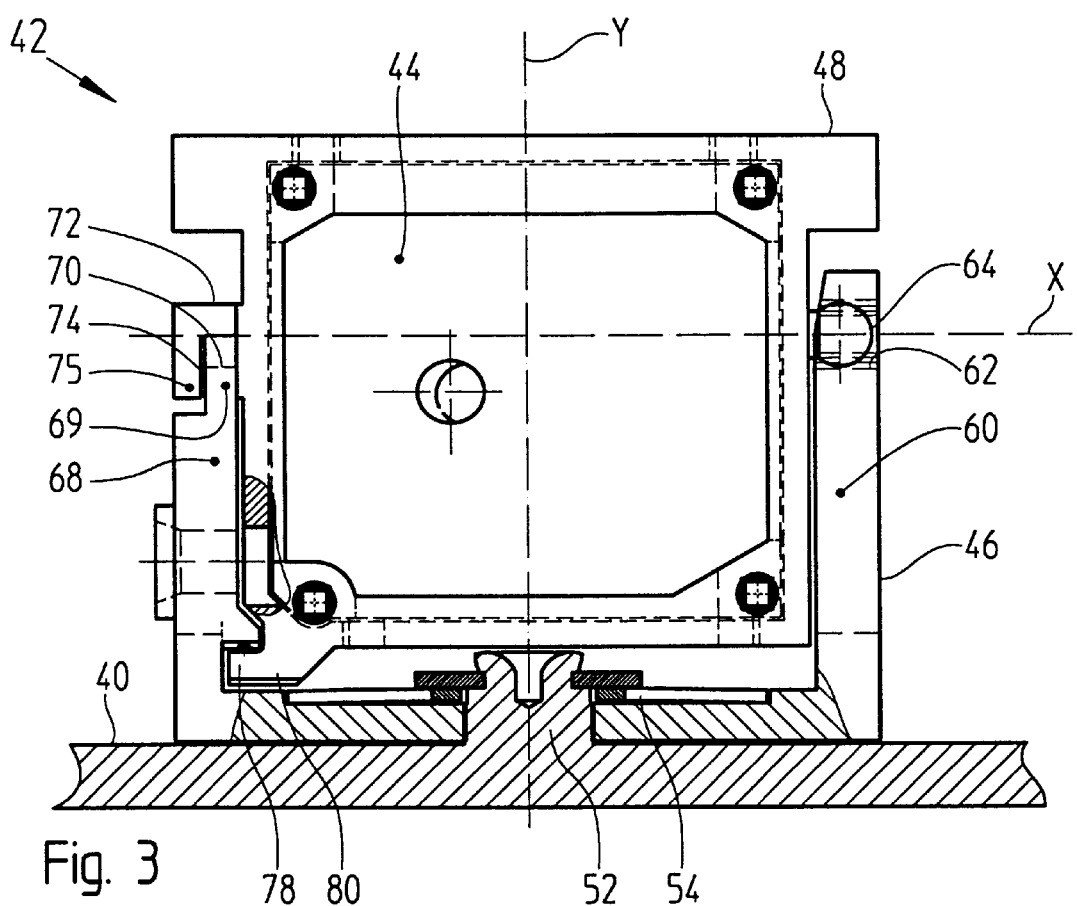
FIG. 3 is a mirror holder, with the mirror in the front view.

The mirror holder 42 shown in FIG. 3 and secured onto a substrate 40 serves for the alignment of a mirror 44 about a first axis designated by X and about a second axis designated by Y. In this embodiment the components which can be mutually aligned relative to one another are also connected together via runners by means of a press fit. The mirror holder 42 has a U-shaped yoke 46 of pressure die cast zinc, which can be pivoted about the Y axis. A frame 48 which likewise consists of pressure die cast zinc and which carries the mirror 44 is journaled in this U-shaped yoke 46. The mirror 44 can be an injection molded part with spigots, which are pressed into the frame 48.

A bearing spigot 52 is cast or molded onto the substrate 40 and the yoke 46 is journaled in clearance-free manner onto the bearing spigot 52 and biased downwardly by means of a spring 54. The spring position is fixed by a bearing spigot 52 flanged at its upper end.

The yoke 46 shown in detail in FIGS. 4 to 6 has a cut-out 56 in its central part, which engages over the bearing spigot 52. Four runners 58, which extend in the axial direction, are arranged uniformly distributed around the periphery of the cutout 56, with the runners forming a press fit with the jacket surface of the bearing spigot 52. In this way an adequate locking of the yoke 46 is ensured on the one hand, and the yoke can, on the other hand, be pivoted about the Y axis for adjustment after the holding force of the press fit has been overcome.

In the limb 60 of the yoke 46 illustrated at the right side in FIG. 3, there is arranged an aperture 62, in which a spherical bearing spigot 64 arranged at the frame 48 engages. It is evident from FIGS. 4 to 6 that runners 66 extending in the axial direction are uniformly distributed around the periphery within the aperture 62. These runners likewise form a press fit in connection with the spherical bearing spigot 64.

In the limb 68 of the yoke 46 illustrated at the left-hand side in FIG. 3, there is arranged a bearing shell 70, which can be better recognized in FIGS. 4 to 6, and into which a bearing spigot 72 arranged on the frame 48 engages. Alongside the bearing shell 70 and approximately tangential to the latter, a runner 74 is molded onto the outer side of the outer section 69 of the limb 68 and presses against the inner side of a hook 75, which extends radially downwardly at the outer end of the bearing spigot 72.

As the open bearing shell 70 only offers support at one side, an inwardly directed projection 76 is molded onto the limb 68 of the yoke 46 shown at the left-hand side in FIG. 3 and a short arm 78 arranged on the frame 48 engages beneath the projection 76. A runner 80 is formed on the arm 78. A press fit results between the bearing shell 70 and the projection 76 at the yoke 46 when the bearing spigot 72 of the frame 48 contacts the bearing shell 70, and the runner 80 on its arm 78 engages beneath the projection 76 at the limb 68 of the yoke 46. The auxiliary mounting position formed by the runner 80 and the projection 76 moves in a radius about the X axis. A press-fit locking around the X axis is thus ensured as long as this auxiliary mounting position is in engagement.

A contact between the frame 48 and the yoke 46 exists via the runners 66, 74 and 80 and also via the bearing position 70, 72.

The adjustment of the frame 48 can, for example, take place by means of a non-illustrated eccentric key, which engages through the yoke 46 into the frame 48 and executes the adjustment in the Y axis via a rotational movement about the X axis. The adjustment in the X axis can likewise be carried out with the eccentric key through a rotational movement around the Y axis.

The adjustment directions around the X and Y axes are independent from one another and do not mutually influence one another. In this arrangement no adhesive bonding or welding process is any longer required after the adjustment process, such as was the case with the prior art.

We claim:

1. An optical apparatus comprising an adjustable holder device having at least one first component which is configured to be aligned with a second component, at least one of the first component and the second component having at least one optical element, the first component and the second component having connection elements cooperating with each other to form press-fit connections, the connection elements for each press-fit connection comprising at least one runner on one of the first and second components and a counter-surface on the other of the first and second components to form a press fit therebetween, wherein the runners include apex edges which are at least partly deformed when the runners are pressed in to cooperate with the counter-surfaces to form press-fit connections, and wherein the connection elements comprise zinc.

2. The optical apparatus in accordance with claim 1 wherein the first component comprises an optical element and the second component comprises a holder.

3. The optical apparatus in accordance with claim 1 wherein both the first component and the second component have optical elements.

4. An optical apparatus comprising an adjustable holder device having at least one first component which is configured to be aligned with a second component, at least one of the first component and the second component having at least one optical element, the first component and the second component having connection elements cooperating with each other to form press-fit connections, the connection elements for each press-fit connection comprising at least one runner on one of the first and second components and a counter-surface on the other of the first and second components to form a press fit therebetween, wherein the first component comprises an optical element and the second component comprises a holder, and wherein the optical element of the first component includes a counter-surface and is directly pressed into a cut-out of the holder of the second component which includes a plurality of runners, the counter-surface of the optical element cooperating with the runners of the cut-out of the holder to form a press fit therebetween.

5. The optical apparatus in accordance with claim 4 wherein the runners include apex edges which are at least partly deformed when the runners are pressed in to cooperate with the counter-surfaces to form press-fit connections.

6. The optical apparatus in accordance with claim 4 wherein the connection elements comprise metal.

7. The optical apparatus in accordance with claim 6 wherein the metal is zinc.

8. The optical apparatus in accordance with claim 4 wherein the cut-out of the holder is cylindrical and the holder includes at least three runners extending in an axial direction of the cut-out and being uniformly distributed around a periphery of the cut-out.

9. An optical apparatus comprising an adjustable holder device having at least one first component which is configured to be aligned with a second component, at least one of the first component and the second component having at least one optical element, the first component and the second component having connection elements cooperating with each other to form press-fit connections, the connection elements for each press-fit connection comprising at least one runner on one of the first and second components and a counter-surface on the other of the first and second components to form a press fit therebetween, wherein both the first component and the second component have optical elements, and wherein the first component comprises a first housing part which carries a first optical element and the second component comprises a second housing part which carries a second optical element, the first housing part having a plurality of runners arranged in an opening, the second housing part being pressed into the opening of the first housing part to cooperate with the runners to form a press-fit connection and being adjustable relative to the first housing part via the press-fit connection.

10. The optical apparatus in accordance with claim 9 wherein the opening of the first housing is cylindrical and the first housing includes at least three runners extending in an axial direction of the opening and being uniformly distributed around a periphery of the opening.

11. The optical apparatus in accordance with claim 9 wherein the first optical element of the first housing part comprises a laser diode and the second optical element of the second housing part comprises a lens of an optical collimation system.

12. An optical apparatus comprising an adjustable holder device having at least one first component which is configured to be aligned with a second component, at least one of the first component and the second component having at least one optical element, the first component and the second component having connection elements cooperating with each other to form press-fit connections, the connection elements for each press-fit connection comprising at least one runner on one of the first and second components and a counter-surface on the other of the first and second components to form a press fit therebetween, wherein the first component comprises an adjustable holder device having a U-shaped yoke and the second component comprises a mirror held in a frame which is pivotally mounted by a press fit in the U-shaped yoke about a first axis, the U-shaped yoke being in turn pivotally mounted about a second axis.

13. The optical apparatus in accordance with claim 12 wherein the U-shaped yoke includes a plurality of runners provided around a cut-out which are configured to cooperate with a counter element of a substrate to form a press fit for pivotally mounting the U-shaped yoke on the substrate about the second axis.

14. The optical apparatus in accordance with claim 12 wherein the U-shaped yoke includes a left limb and a right limb, the right limb having a plurality of runners provided around a cut-out which cooperate with a spherical counter element of the frame to form a press fit, the left limb having a runner on an outer side of an outer section thereof which cooperates with an inner side of a downward extending counter element of the frame to form a press fit, the left limb having an inwardly directed projection, the frame having a short arm disposed beneath the inwardly directed projection of the left limb, the short arm having a runner which cooperates with the inwardly directed projection of the left limb to form a press fit.

* * * * *